March 5, 1957 R. F. WILEY 2,783,589
TAKE-OUT FOR GLASSWARE
Filed June 9, 1952 2 Sheets-Sheet 2
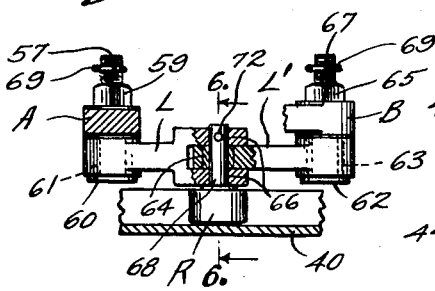
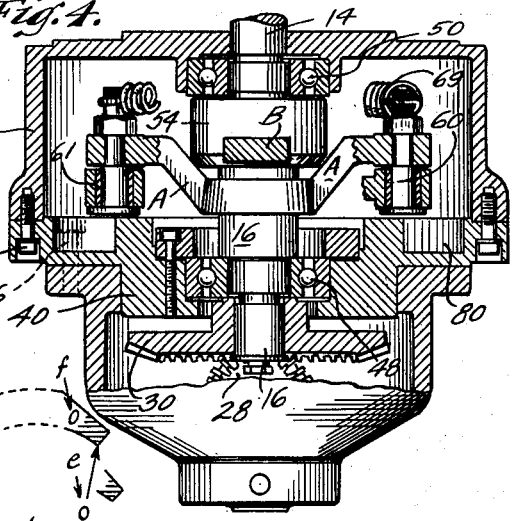
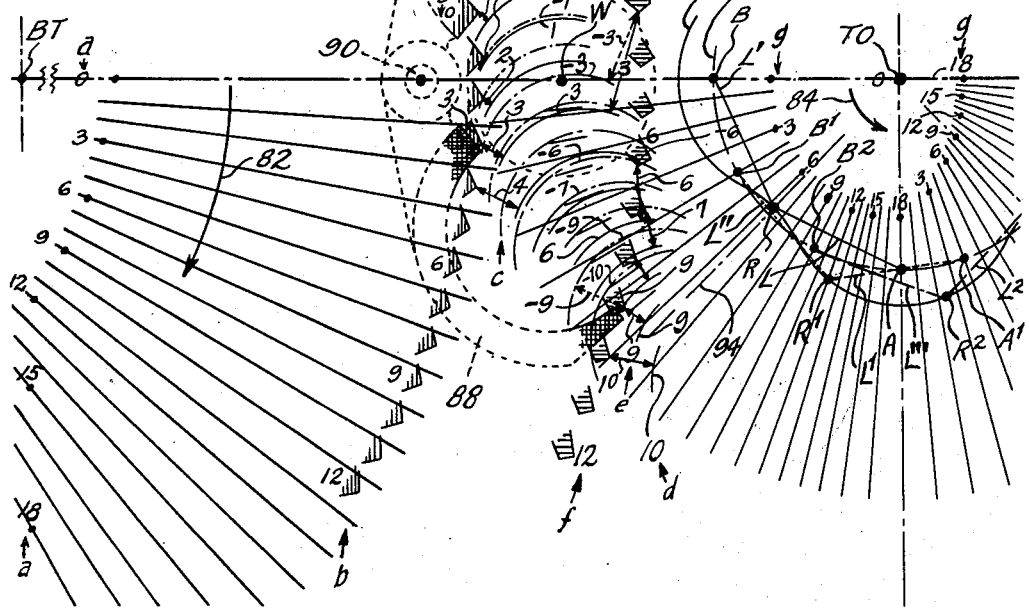
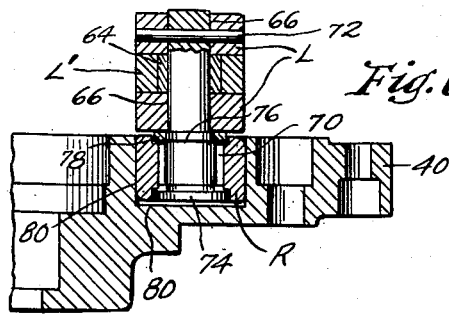
Inventor.
Robert F. Wiley.
By Bair, Freeman & Molinare
Attys.

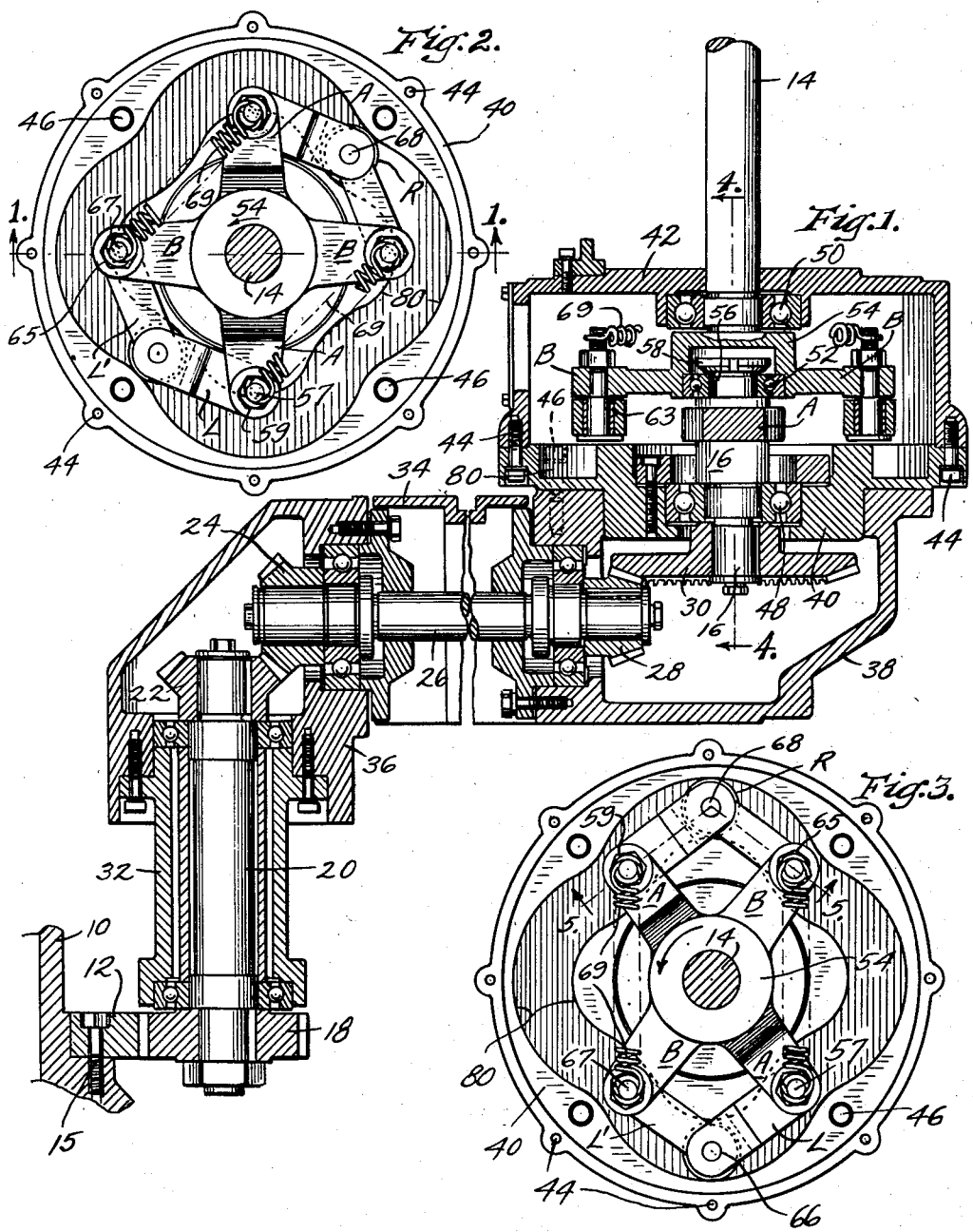

United States Patent Office 2,783,589
Patented Mar. 5, 1957

2,783,589

TAKE-OUT FOR GLASSWARE

Robert F. Wiley, Anderson, Ind., assignor to Lynch Corporation, Anderson, Ind., a corporation of Indiana Application June 9, 1952, Serial No. 292,427

4 Claims. (Cl. 49—14)

This invention relates to a "take-out" for use in connection with glassware-making machines and particularly to the driving mechanism for the take-out so as to impart a variable speed thereto in order for the ware to properly clear the mold during the take-out operation. The particular type of take-out for which the present invention is applicable is one of the "4-arm" type, although the driving mechanism disclosed can be designed for 2-arm and 3-arm take-outs as well.

As representative of the 2-arm type, attention is called to Bridges Patent No. 2,015,662 and Langer et al. Patent No. 2,307,517. In these patents the take-out is driven through bevel gears from a blow table which in turn is driven by a Geneva movement so that the intermittent rotation of the take-out is the same as the intermittent rotation of the table—starting slowly, speeding up at the center of the motion, and slowing down at the end of the motion.

Where a 2-arm take-out is being used, the intermittent rotation thereof is through an angle of 180°. This results in sufficient speed of movement of the ware by the take-out to clear the ware with respect to its mold which is open at the take-out station of the blow table, without any unusual problems arising and this applies to relatively large ware as well as small ware.

When, however, a 4-arm take-out is used, the arc of movement each cycle of operation is only 90° and with the former gearing arrangement shown in the patents referred to the speed would only be half as much. A 4-arm take-out, however, has the advantage that three stations in addition to the take-out station may be provided, at which three stations cooling, fire-finishing and take-away (to the annealing lehr) may be performed, or two cooling stations in addition to the take-out and take-away stations may be provided. Difficulty is then experienced in clearing especially large ware with respect to the blow table mold which is open at the take-out station.

Obviously, therefore, if the first portion of the take-out arm movement can be speeded up and the last portion slowed down during the 90° arc of rotation, the ware can be cleared of the mold and the primary object of my present invention is to provide a comparatively simple mechanism for this purpose which may be interposed between the drive from the blow table and the take-out shaft running up to the take-out arms.

Another object is to provide mechanism of this character consisting of a drive shaft and a driven shaft in alignment with each other to conform to the general design of the machine as shown in the Bridges and Langer et al. patents, and comprising a drive arm and a driven arm connected with the respective shafts and connected together by a pair of links which are pivoted to each other and provided with a roller at the pivot joint, a cam groove being provided in which the roller travels and which, accordingly, jack-knifes the links more or less to speed up or slow down respectively the driven arm with respect to the drive arm and thus the driven shaft with respect to the drive shaft, the driven shaft having the take-out arms mounted thereon.

A further object is to provide mechanism of the character just referred to which can be readily mounted in an enclosing housing filled with oil, the enclosing housing being mounted on the bevel gear housing of the usual take-out drive of a glassware forming machine.

Still a further object is to provide driving mechanism for take-out arms which may accomplish any desired initial speed-up required by a change in the shape of the cam groove for the rollers.

With these and other objects in view, my invention consists in the construction, arrangement and combination of the various parts of my take-out for glassware, whereby the objects contemplated are attained, as hereinafter more fully set forth, pointed out in my claims and illustrated in the accompanying drawings, wherein:

Figure 1 is a vertical sectional view through my take-out drive mechanism and includes the gearing extending back to the blow mold table.

Figure 2 is a plan view of the mechanism with the housing removed and the bolts that hold it in position shown in section, Figure 1 being taken on the line 1—1 of Figure 2, the parts being in the position they assume during the non-operating or "at rest" portion of the Geneva movement.

Figure 3 is a plan view similar to Figure 2 showing the parts advanced about 37° beyond the at rest position of Figure 2.

Figure 4 is a vertical sectional view on the line 4—4 of Figure 1.

Figure 5 is a vertical sectional view on the line 5—5 of Figure 3.

Figure 6 is an enlarged vertical sectional view on the line 6—6 of Figure 5; and Figure 7 is a diagrammatic view to show different positions of the parts during the take-out operation.

On the accompanying drawings I have used the reference numeral 10 to indicate a portion of the table of a glassware forming machine such as shown at 11 in the Bridges patent and at 2 in the Langer et al. patent. The table 10, as already mentioned, may be driven by a Geneva movement and in this application I have shown a design suitable for a six-station machine where in each cycle of operation the table is rotated 60°. A take-out drive gear 12 is secured to the table as by bolts 15 for driving the take-out shaft which on my drawings I show at 14. The shaft 14 extends upwardly and is provided with a 4-arm take-out at its upper end which is not illustrated because the general details thereof are shown in the two patents mentioned and do not form part of my present invention.

I provide a drive shaft 16 for the take-out shaft 14, the take-out shaft 14 being the "driven" shaft and referred to as such in the present specification and claims. To intermittently rotate the drive shaft 16 in proportion to the rotation of the blow mold table 10, there is provided a pinion 18 mounted on a shaft 20 on which there is also mounted a bevel gear 22 as shown in Figure 1. The bevel gear 22 meshes with a bevel gear 24 on a shaft 26 having a bevel pinion 28 on its right-hand end. The bevel pinion 28 meshes with a bevel gear 30 mounted on the drive shaft 16.

The shafts 20 and 26 are suitably journaled in housings 32 and 34 connected together by a bevel gear housing 36 as clearly shown in Figure 1. There is also provided a second bevel gear housing 38 for the gears 28 and 30. The housings 32, 34, 36 and 38 are suitably supported on the base of the glassware forming machine, but since the drive from the take-out drive gear 12 of the blow mold table 10 to the bevel gear 30 on the drive shaft 16 forms no part of my present invention, I have not illustrated the details of mounting for the housings enumerated. They are stationary and provide a support for my variable speed take-out drive which will now be described.

I provide a housing for the mechanism comprising my present invention which consists of a base plate 40 and a housing-like cover 42 therefor, the two being secured together as by bolts 44. The base plate 40 is secured to the bevel gear housing 38 as by bolts 46. Ball bearings 48 and 50 are provided for the drive shaft 16 and the driven shaft 14 respectively. A third ball bearing 52 acts as a connection between the two as will hereinafter appear which permits oscillation of one relative to the other.

Extending from opposite sides of the drive shaft 16 are drive arms A. The lower end of the driven shaft 14 terminates in a hub 54 in which the bearing 52 is located, the bearing surrounding a reduced portion 56 of the upper end of the drive shaft 16 above the arms A. A collar 58 for the bearing 52 is provided for retaining the bearing 52 on the reduced portion 56. Driven arms B extend from opposite sides of the hub 54.

The arms A are provided with pivot pins 60 depending therefrom and the arms B are provided with pivot pins 62 likewise depending therefrom. Links L and L' are each pivoted at one end on the pins 60 and 62 respectively as shown in Figure 5 and the outer end of each link L is forked to straddle the other end of each link L'. The links L' are provided with bearing sleeves 64 and the arms of the links L are perforated as at 66 to receive roller pins 68. A roller R is mounted on each roller pin 68 and may be provided with a needle bearing 70 as shown in Figure 6 to reduce friction as the roller rotates on the roller pin. A cross pin 72 is located through the upper arm of each link L and each roller pin 68 to fix the roller pin with respect to the link L.

Referring to Figure 6, further details are shown of the roller pin. It is provided with a head 74 to keep the roller R in position and has a shoulder 76 against which a washer 78 is mounted to contact the lower arm of the link L. The pivot pins 60 and 62 are shouldered as illustrated in Figures 1, 4 and 5 and bushings 61 and 63 are provided in the links L and L' to rotate on the pivot pins. Nuts 59 and 65 respectively retain the pivot pins 60 and 62 located in the drive arms A and the driven arms B, and the upper ends of the pins are extended as at 57 and 67 and provided with grooves therearound for the connection of springs 69 thereto. The springs 10 bias the pins 60 and 62 toward each other and the rollers R thereby toward the axis of rotation, thus eliminating play in the operating mechanism.

The base plate 40 is provided with a cam groove 80 for the rollers R to travel in. The cam groove may be of any desirable shape but I have found the four-leaf clover shape shown as particularly suitable for my purpose when used in connection with a blow-mold table driven by a Geneva drive. The rollers R are in the "at rest" position of the mechanism at those portions of least radial extent of the cam groove as shown in Figure 2. As the drive arms A rotate counterclockwise to the position shown in Figure 3, the rollers R travel from the "low" portions of the cam to the radially "high" portions thereof and in so doing increase the jack-knifing of the link L and L'. By comparing Figure 3 with Figure 2, it will be seen that the jack-knifing is less in Figure 2.

It will also be evident that the driven arms B have moved closer to the drive arms A as a result of the increase of the jack-knifing effect. Therefore, it is obvious that the driven arms have been speeded up and likewise the movement of the take-out speeded up during the 37° of movement from the stationary Figure 2 position to the Figure 3 position. It is further obvious that during the next 53° of movement to complete 90° of take-out movement constituting a cycle of operation thereof, the jack-knifing will decrease and thereby the driven arms B will be slowed down relative to the drive arms A so as to complete their 90° of rotation coincident with the 90° of rotation of the drive arms.

In Figure 7 I illustrate diagrammatically increments of motion of the drive arms, the driven arms and the blow-mold table. The reference characters A, B and R have been used to indicate the pivots 60 and 62 of the drive arms A and driven arms B and the axis 68 of the roller R respectively.

Obviously if the cam groove 80 were a perfect circle, there would be no change in the jack-knifing of the links L and L' and accordingly no speed-up of the driven arms B relative to the drive arms A. Therefore if the cam groove is modified form a circular shape, the arms B can be either speeded up or slowed down with respect to the arms A in various positions of rotation.

Referring to Figure 7, a horizontal center line extends through centers BT and TO. BT represents the blow table axis of rotation and TO the take-out axis of rotation. According to the scale used in Figure 7, BT occurs a considerable distance toward the left of the sheet and accordingly this has been represented by a break line in the horizontal center line adjacent BT. The vertical center lines through BT and TO represent 90° of rotation of the blow-mold table and the take-out respectively, the table rotating clockwise and the take-out rotating counterclockwise as indicated by the arrows 82 and 84.

The blow-mold table rotates 60° while the take-out rotates 90° and accordingly in the lower right quarter of the circle for the take-out TO, I have placed radii 5° apart to divide this quarter into 18 increments of movement for the arms A. Since the blow table rotates only 60°, the radii are indicated for it at 3⅓° spacing. This represents equal increments of movement of the drive shaft 16 in relation to those indicated for the blow table and its take-out drive gear 12.

Also represented in Figure 7 is a blow mold at the take-out station of the blow table which station falls on the horizontal center line 0 through BT and TO. This is the station 0 for both the blow mold table and the take-out, one of the four sets of take-out tongs being centered thereon as indicated by the dot W (center or axis of the ware). The size of the ware is indicated by a circle W' which is partially a full-line and partially a dotted line.

The blow mold is made in halves, the upper half being indicated at 86 and the lower half at 88. These halves are pivoted on a vertical pin 90 carried by the blow table and aligned on the horizontal center line 0 through BT and TO at the take-out station of the table. The significant corners (inner and outer) of the mold half 86 with which we have to contend with from the standpoint of clearance of the ware W' are shaded with vertical and horizontal lines respectively, while the corresponding corners of the mold half 88 are cross-hatched. These latter corners, however, need not be taken into consideration as they swing away from the take-out rather than toward it as the shaded inner and outer corners of the mold 86 do.

As the blow-mold table rotates in the direction of the arrow 82, the inner corners of the mold 86 will take up successive positions as shown, all by vertical shading and every third one numbered (0, 3, 6, 9 and 12). They are the positions of the inner corners corresponding to stations 0 to 18 indicated by the radii converging to the point BT and every third one numbered in a more or less arcuate column between upper and lower reference characters a. Likewise in arcuate column b—b the corresponding stations of the inner corners of the mold 86 are numbered as already referred to as far as No. 12 which is sufficient for our purpose. Similarly the outer corners of the mold 86 in the successive portions as shown by horizontal shading are numbered from 0 to 12 in an arcuate column f—f. In another arcuate column about the center TO and indicated d—d, the stations for the circle W' indicating the ware diameter are indicated starting with 0 to correspond to the initial station of the take-out.

As already referred to, the lower right quarter of the take-out diagram has radii at 5° intervals indicating the increments of movement of the arms A. In the diagram the dot A represents the position of the center 60 for one of the arms A which center falls on a dot-and-dash arc 92 indicating the radius of swing of both 60 and the center 62 for the arm B. Likewise a dot B is shown at the intersection of this arc with the horizontal center line to indicate the position of the center 62 for one of the arms B at the beginning of the take-out operation.

In the lower left quarter of the take-out diagram I illustrate variable increments of movement which are for the center B, the cam groove center being indicated on this diagram as 80C. It will be noted that R is at the low position of the cam groove and A leads B by 90° which positions R at the 45° radii 94.

As the arms A advance in equal increments through the lower right quadrant, the point B travels unequal increments through the lower left quadrant, the corresponding radii being shown and every third one indicated rather than every one in order to avoid confusion on the drawing. The increments are from 0 to 18 and then repeat and are in a semi-circular column g.

When the cam groove 80 is of the shape shown in Figures 2 and 3, and its center for the roller R is the same shape as shown at 80C in Figure 7, the unequal increments of movement of the point B will be as illustrated. In tabular form, they will be as follows:

S—Station
A—Total travel of center 60 for A (5° increments)
B—Total travel of center 62 for B (unequal increments)
TB—Travel of center 62 for B in successive increments
D—Difference in B increments relative to A increments
TD—Total increase of B increments relative to A increments

| S | A | B | TB | D | TD |
|---|---|---|---|---|---|
| | Degrees | Degrees | Degrees | Degrees | Degrees |
| 0 | 0 | 0 | 0 | 0 | 0 |
| 1 | 5 | 5¾ | 5¾ | +¾ | ¾ |
| 2 | 10 | 13 | 7¼ | +2¼ | 3 |
| 3 | 15 | 21½ | 8½ | +3½ | 6½ |
| 4 | 20 | 29¼ | 7¾ | +2¾ | 9¼ |
| 5 | 25 | 36½ | 7¼ | +2¼ | 11½ |
| 6 | 30 | 43 | 6½ | +1½ | 13 |
| 7 | 35 | 48¾ | 5¾ | +¾ | 13¾ |
| 8 | 40 | 53¾ | 5 | 0 | 13¾ |
| 9 | 45 | 58½ | 4¾ | −¼ | 13½ |
| 10 | 50 | 62¼ | 3¾ | −1¼ | 12¼ |
| 11 | 55 | 66 | 3¾ | −1¼ | 11 |
| 12 | 60 | 69½ | 3½ | −1½ | 9½ |
| 13 | 65 | 72¾ | 3¼ | −1¾ | 7¾ |
| 14 | 70 | 75¾ | 3 | −2 | 5¾ |
| 15 | 75 | 78½ | 2¾ | −2¼ | 3½ |
| 16 | 80 | 81½ | 3 | −2 | 1½ |
| 17 | 85 | 85¼ | 3¾ | −1¼ | ¼ |
| 18 | 90 | 90 | 4¾ | −¼ | 0 |

In the above tabulation, the degrees given in any horizontal column represent the travel, difference or increase between the previous station and the one for that horizontal column. It will be noted that under TB the successive increments increase rapidly until station 4 is reached. Then they decrease until station 8, the TB travel is substantially equal to the A travel and thereafter TB increments decrease relative to A increments to a minimum at station 15 whereupon TB increments increase again until station 18 is reached which is the same as station 0 or the start of the next cycle of operation of the take-out.

Returning now to Figure 7, and particularly the column d—d thereof, the circle for the ware W' is shown partially full and partially dotted as already referred to. Thereafter only arcs of the circle are shown for the ware at the various stations 0, 1, 2, 3, etc. in the lower left quadrant of the take-out diagram. These arcs, not all of which are numbered (1, 3, 6, 9 and 10 only being numbered) are positioned with respect to the vertically shaded inner corners of the mold half 86 and the horizontally shaded outer corners thereof to show the clearance in columns c—c and e—e respectively. The clearance, for instance, between the circle W' labled 0 in column d—d and the inner corner 0 in column b—b is indicated by a dimension line 0 in column c—c. The clearance for station 1, in column c—c, is merely a dot as at this point the clearance is minimum, the full-line circles only being taken into consideration and disregarding the dot-and-dash line circles for the time being. At station 2 in column c—c, the clearance is indicated by a small diamond. At station 3, the clearance is increasing and it has considerably increased at station 4. After that, through stations 5, 6, etc. the clearance becomes greater and greater so need not be referred to in detail.

With respect to the clearance of the outer corners shown in column f—f, the column e—e shows by means of dimension lines with arrow heads at their ends the clearance at the various stations. The clearance at station 0 is considerable but is reduced somewhat at station 3. The dimension line at 6 shows the clearance reduced until finally at about stations 8 and 9 it has reached minimum and starts to increase at station 10. Since clearance has been effected at stations 8 and 9, the point B may now be slowed down relative to the point A so that B will arrive at the vertical center line 18 in Figure 7 at the same time that A arrives at the horizontal center line 18. The column D in the above tabulation shows the difference in B increments relative to A increments as increasing from station 0 to station 8 and then decreasing from station 8 to station 18 and this is also evident by comparing the radii in the lower left quadrant of the take-out diagram in Figure 7.

Referring now to the dot-and-dash circles, in column d—d, all nine of which are shown and −1, −3, −6, −9 and −10 of which are labeled, these would be the position of the circumference W' of the ware if the take-out shaft 14 were moved equal increments corresponding to those of the blow mold table as in the prior patents referred to. It will be noted that −1 has started to interfere with the inner corner of the mold 86 (column c—c); whereas −2 interferes a little more and −3 starts to clear. As to the outer corner, however, −3 shows less clearance than 3 in column e—e and −6 in d—d has started to interfere at −6 in e—e, this being the outer corner indicated as −6 in column f—f. At the next station the outer corner 7 in column f—f is considerably past the dot-and-dash arc, −7 in column d—d indicating that much interference and the interference increases at stations 8 and 9 and starts to decrease at station 10. It is obvious, therefore, that equal increments of movement of the take-out arm will not clear the ware of the mold in the successive positions of each when the take-out arms swing through only a quarter circle, yet to obtain the advantages of only 90° of rotation of the take-out each cycle of operation, my variable speed drive as herein disclosed may be provided and will take care of clearing the ware with respect to the mold providing the cam groove 80 is of the proper shape and magnitude. Such shape and magnitude may be varied to secure more or less clearance and to accommodate larger ware if desired, but of course is originally designed so as to take care of the largest ware capable of being blown in the machine and will therefore accommodate any ware smaller than that diameter.

In Figure 7 I have shown three positions of A, B and R at random, the stations for B being designated 0, 4 and 10. The reference characters used for station 4 are $A^1$, $B^1$, $R^1$, $L^1$ and $L''$. Those used for station 10 are $B^2$, $R^2$, $L^2$, and $L'''$ ($A^2$ not shown as it falls off the drawing). In Figure 2 the position of the parts are for station 0, while in Figure 3 they have moved to a station between 7 and 8 at which station the rollers R are farthest out from the center. This corresponds to approximately the highest speed point of the blow-mold table movement or about 25° of the 60° of movement, the rotator arm of the Geneva movement at that time being deepest in the slot of the star wheel.

If the cam groove 80 were substantially square with rounded corners, the desired clearance between ware and mold could be had but since the greatest speed of rotation of the drive shaft 16, due to the action of the Geneva drive, is around station 9, it is desirable to slow down the driven shaft 14 at this point to prevent too much whipping action of the take-out arms. Accordingly, I prefer the four-leaf clover shape shown in preference to a substantially square cam groove.

From the foregoing specification it will be obvious that I have provided a comparatively simple mechanism to introduce variable speed into the take-out shaft 14 from the drive shaft 16 which (although 16 varies because of the Geneva movement driving the table 10 and effects such drive with equal increments of movement of 16 in proportion to 10) may be interposed between 16 and 14 without undue complications of mechanism or assembly. By the use of a pair of opposite drive arms A and a pair of opposite driven arms B, linked together with rollers at the pivot points between the links and a cam track of suitable shape for the rollers, I am able to secure the desired speed-up and slow-down of movement of the arms B in relation to movement of the arms A during a cycle of operation. A single arm, one set of links and one roller may be used, but for balancing the torque and the wear I provide the dual arrangement disclosed. The driving torque of the take-out tends to keep the rollers R against the inner surface of the cam groove 80, and to aid in this respect the springs 69 are provided which also serve the purpose of taking up any play that might develop as a result of wear. While I have shown the cam as a groove, it may be an external cam only, the outer wall being provided merely as a positive means to prevent any excessive jack-knifing of the links L and L' in the event of malfunctioning of the parts.

Some changes may be made in the construction and arrangement of the parts of my take-out for glassware without departing from the real spirit and purpose of my invention, and it is my intention to cover by my claims any modified forms of structure or use of mechanical equivalents which may be reasonably included within their scope.

I claim as my invention:

1. The method of taking out glassware from a forming machine of the type having an intermittently rotated blow-mold table operative to index molds to a series of dwell stations, which comprises the steps of engaging the ware by an intermittently rotating take-out arm while the ware is at a dwell station of said table, moving the ware first at a higher rate of linear speed than the movement of a mold between dwell stations, then moving the ware at a lower rate of linear speed than the movement of a mold between dwell stations, and regulating said rates of linear speed during indexing movements of said take-out arm whereby the total elapsed time between dwells of the take-out arm is substantially equal to the total elapsed time between dwells of said table.

2. The method of taking out glassware from a forming machine having an intermittently rotated blow-mold table operative to index molds through an arcuate path to a series of dwell stations, which comprises the steps of engaging the ware by an intermittently rotating take-out arm while the ware is at a dwell station of said table, moving the ware through an arcuate path, first at a higher rate of linear speed than the movement of a mold between dwell stations, then moving the ware at a lower rate of linear speed than the movement of a mold between dwell stations, and regulating said rates of linear speed during indexing movements of said take-out arm whereby the total elapsed time between dwells of the take-out arm is substantially equal to the total elapsed time between dwells of said table.

3. In a glassware forming machine, an intermittently rotated blow-mold table operative to index molds through an arcuate path to a series of dwell stations, an intermittently rotated transfer mechanism of cyclically variable speed relative to the movement of said blow-mold table, said transfer mechanism including a take-out arm and a drive shaft driven by said blow-mold table, and a variable-speed coupling operatively connecting said drive shaft and said take-out arm whereby said take-out arm is alternately speeded up and slowed down relative to the linear movement of a mold between dwell stations, the total elapsed time between indexing movements of the take-out arm being substantially equal to the total elapsed time between indexing movements of said blow-mold table.

4. In a glassware forming machine, an intermittently rotated blow-mold table, an intermittently rotated transfer mechanism of variable angular velocity relative to the movement of said blow-mold table, said transfer mechanism having a take-out arm and a drive shaft therefor, said drive shaft being driven by said blow-mold table, and a variable-speed coupling operatively connecting said drive shaft and said take-out arm whereby said arm is alternately speeded up and slowed down relative to the movement of said blow-mold table during each indexing movement of said table.

References Cited in the file of this patent

UNITED STATES PATENTS

| | | |
|---|---|---|
| 2,398,100 | Lear | Apr. 9, 1946 |
| 2,514,420 | Shapiro | July 11, 1950 |
| 2,555,117 | Collins | May 29, 1951 |
| 2,589,852 | Overacker | Mar. 18, 1952 |